United States Patent [19]

Honkisz

[11] Patent Number: 5,787,128
[45] Date of Patent: Jul. 28, 1998

[54] NONLINEAR SIGNAL CORRELATOR AND METHOD THEREFOR

[75] Inventor: Jennifer Ann Honkisz, Schaumburg, Ill.

[73] Assignee: Motorola, Inc., Schaumberg, Ill.

[21] Appl. No.: 577,442

[22] Filed: Dec. 22, 1995

[51] Int. Cl.[6] .............................. H03D 1/00; H04L 27/06
[52] U.S. Cl. ................ 375/343; 364/728.03; 364/728.06
[58] Field of Search ........................... 375/343, 342,
375/365, 368, 208, 209; 370/514, 509;
364/728.03, 728.06

[56] References Cited

U.S. PATENT DOCUMENTS

| | | | |
|---|---|---|---|
| 4,648,098 | 3/1987 | Kerr | 375/336 |
| 5,113,415 | 5/1992 | Muto . | |
| 5,115,208 | 5/1992 | Masdea et al. . | |
| 5,365,549 | 11/1994 | Kazecki . | |
| 5,661,764 | 8/1997 | Nakajima | 375/368 |

OTHER PUBLICATIONS

"Difference Detection of /4–Shifted-DQPSK for Digital Cellular Radio"–Sandeep Chennakeshu, & GaryJ>Saulnier—Published IEEE Transactions on Vehicular Technology, vol. 42, No. 1, Feb., 1993.

"Performance of an Implemted Complex Correlator With a Simulated Stationary Dispersive Radio Channel"—Bo Olsson—Published European Conference on Electrotechnics, 1988.

*Primary Examiner*—Don N. Vo
*Attorney, Agent, or Firm*—Kevin D. Kaschke

[57] ABSTRACT

A nonlinear complex signal correlator (129) correlates a complex received signal (123) with a complex reference signal (128) to produce a positive unbiased complex correlation signal (476). The phase component of the received signal (123) and the phase component of the reference signal (128) are added (416–429) at multiple points in time to produce samples of the complex correlation signal (462–475). The samples of the complex correlation signal (462–475) are summed (430) to produce a complex correlation signal (131). A bias (505) of the complex correlation signal (131) is determined (431, 432). The bias (505) is removed (433–446) from each of the samples of the complex correlation signal (462–475) to produce unbiased samples of the complex correlation signal (477–490). An absolute value (447–460) of each of the unbiased samples of the complex correlation signal (477–490) is determined to produce positive unbiased samples of the complex correlation signal (491–504). The positive unbiased samples of the complex correlation signal (491–504) are summed (461) to produce the positive unbiased complex correlation signal (476).

47 Claims, 9 Drawing Sheets

NONLINEAR SIGNAL CORRELATOR

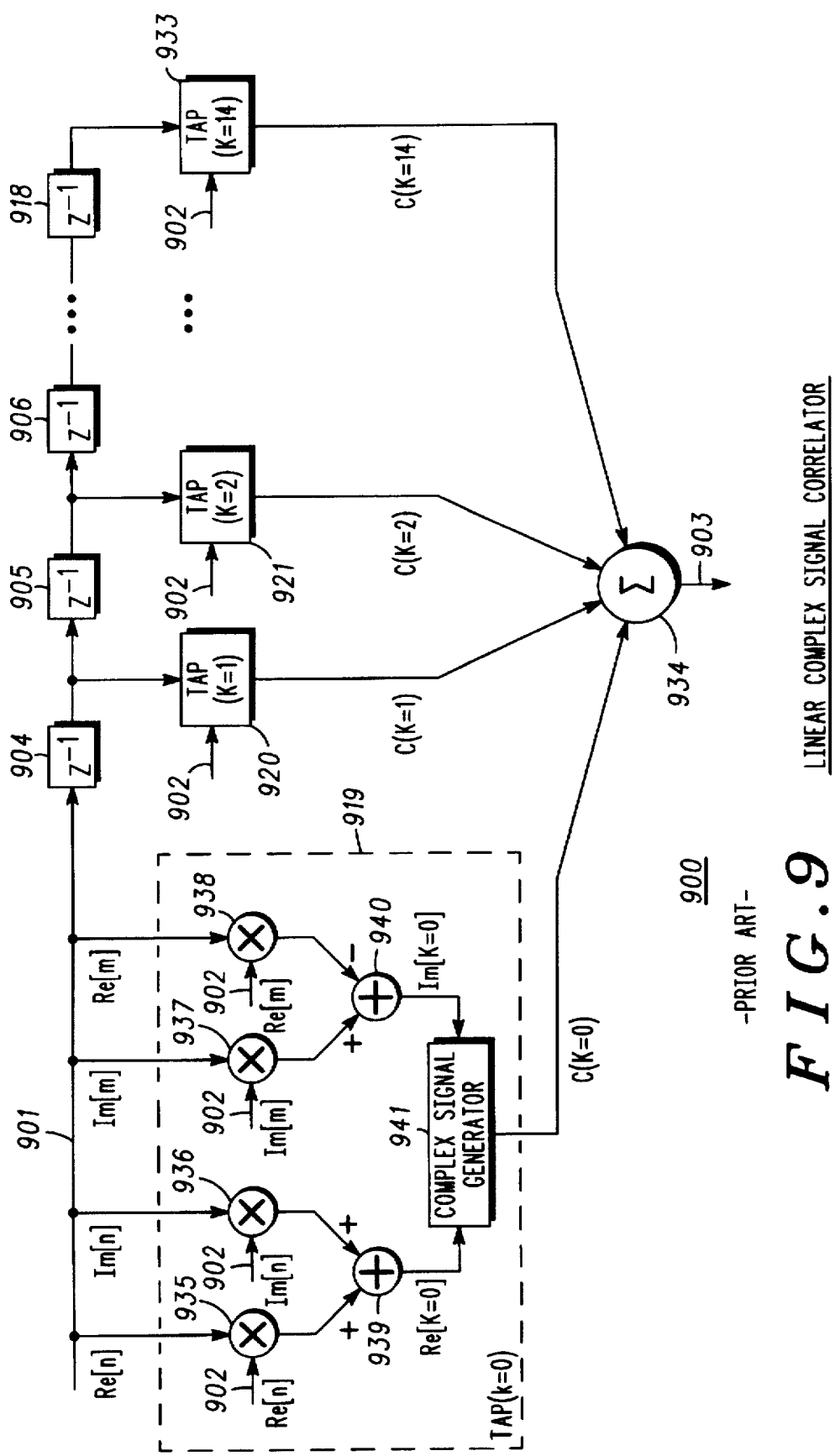
FIG. 9 -PRIOR ART- LINEAR COMPLEX SIGNAL CORRELATOR

NONLINEAR SIGNAL CORRELATOR AND METHOD THEREFOR

BACKGROUND OF THE INVENTION

The present invention relates generally to signal correlators for communication units, and more particularly to a nonlinear signal correlator and method therefor for a time-division-multiple-access (TDMA) cellular telephone.

The basic operation and structure of communication systems, such as cellular telephone communication systems and land mobile communication systems, are well known in the art. For example, a TDMA cellular telephone system is specified in TIA/EIA Interim Standard IS-54, published by and available from the EIA Engineering Publications Office, 2001 Pennsylvania Ave., N.W., Washington, D.C. 20006 (hereinafter the "EIA/TIA Interim Standard IS-54"). The EIA/TIA Interim Standard IS-54 is incorporated herein by reference.

In general, communication systems typically comprise a plurality of communication units, a predetermined number of base stations (or repeaters) located throughout a geographic region and a controller. The communication units may be vehicle mounted or portable units. The communication units and the base stations each comprise a transmitter, a receiver or both a transmitter and a receiver to form a transceiver. The communication units communicate with the base stations over a communication channel over which modulated signals, such as radio frequency (RF) signals, are transmitted and/or received. The controller typically comprises a centralized call processing unit or a network of distributed controllers working together to establish communication paths for the communication units in the communication system.

More particularly, the receiver includes, inter alia, a demodulator, a sampler, a memory unit, a correlator and a detector. A receiver in the communication unit receives a modulated signal on the communication channel to produce a received signal subsequent to transmission of the modulated signal by a transmitter of a base station. The demodulator demodulates the modulated signal to produce a demodulated signal. The sampler samples the demodulated signal at multiple points in time to produce a sampled signal. The memory unit stores a reference signal. Both the modulated signal and the reference signal are complex signals represented by real and imaginary components. The correlator correlates, at the multiple points in time, the sampled signal with the reference signal to produce a complex correlation signal. The complex correlation signal is used to determine an optimum sampling point for synchronization, signal recovery and channel sounding, for example.

FIG. 9 illustrates a block diagram of a conventional linear complex signal correlator 900 for correlating a received signal 901 with a reference signal 902 to produce the complex correlation signal 903. An abbreviated version of the conventional linear complex signal correlator 900 is illustrated for simplicity. The conventional linear complex signal correlator 900 generally includes fourteen delay elements 904–918 (904–6 and 918 are shown), fourteen taps 919–933 (919–921 and 933 are shown), and one complex summer 934. Tap (k=0) has four multipliers 935–938, two adders 939 and 940, and a complex signal generator 941. Taps (k=1–14) also have four multipliers, two adders and a complex signal generator, like tap (k=0).

The conventional linear complex signal correlator 900 is implemented as a complex finite impulse response (FIR) filter as shown in FIG. 9. The number of taps are equal to the number of samples in the sync word of the sampled signal 901. Complex correlators that correlate a received signal with a reference signal using both the magnitude component and the phase component are known as linear correlators. The conventional linear complex signal correlator 900 performs four multiplication operations 935–938 and two addition operations 940 and 941 per tap. Equations EQ-1, EQ-2 and EQ-3 define the operation of the conventional linear complex signal correlator 900. In EQ-1 and EQ-2, Cn is the complex correlation signal, S(n) is the reference signal, Rx(n) is the sampled signal, "k" is an index, "*" denotes a complex conjugate.

$$C_n = S(n)^* Rx(n) \qquad \text{EQ-1:}$$

$$C_n = \sum_{k=0}^{14} S(k) Rx(n-k) \qquad \text{EQ-2:}$$

wherein:

$$S(n) = s_r(n) + j s_i(n)$$

$$Rx(n) = rx_r(n) + j rx_i(n).$$

Expanding the real and imaginary components in EQ-2 results in:

$$C_n = \sum_{k=0}^{14} (s_r(k) rx_r(n-k) - s_i(k) rx_i(n-k) + j(s_i(k) rx_r(n-k) + s_r(k) rx_i(n-k))) \qquad \text{EQ-3:}$$

Both the sampled signal and the reference signal are complex signals having real and imaginary components. The real component of the complex signal is represented by the magnitude of the In-phase (I) component. The imaginary component of the complex signal is represented by the magnitude of the Quadrature (Q) component. The I and Q components together represent the amplitude and phase of the complex signal. Therefore, complex correlation is performed by treating the I and Q components as a complex number with the magnitude of the I component representing the real part of the signal and the magnitude of the Q component as the imaginary part of the signal. In the TDMA cellular telephone system π/4 Differential Quadrature Phase Shift Keying (DQPSK) signaling has symbol information modulated as in-phase (I) and quadrature (Q) components.

As shown in EQ-3, the complex correlation signal for each index "k" has four multiply operations and two add operations. These correspond to the four multipliers 935–938 and two adders 939 and 940 for each tap 919–933 as shown in FIG. 9.

Implementing the multipliers in hardware requires many parts which is costly, space consuming and is current drain sensitive. Likewise, implementing steps of multiplying in software requires many code instructions which is also current drain sensitive.

The conventional linear complex signal correlator 900 as shown in FIG. 9 and described in EQ-3 needs approximately 27,000 Motorola Standard Cell Gates to implement the four multipliers 935–939 for each tap 919–933. The current drain for these 27,000 gates is calculated according to EQ-4.

Current drain=4 [uA/(gates×MHz)]×Number of Gates×Gate Frequency  EQ-4

A hardware implementation of the conventional linear complex signal correlator 900 results in a current drain of approximately 21 mA (ie. 4×27000 gates×0.1944 MHz=~21 mA).

Furthermore, fading channels can cause the linear complex correlation signal 903 to fall below a predetermined threshold. This results in poor acquisition time as well as dropped syncs. Therefore, a linear complex correlation signal 903 must also be normalized by the average received signal power to correct for a signal received in a fading channel. Normalizing typically requires an averager and a divider. The averager averages the received signal strength indication (RSSI) of the signal. Although normalizing is not much overhead for software, it requires additional hardware. A hardware implementation of the normalizing function would use approximately 1,500 Motorola Standard Cell Gates. Again referring to EQ-4, a hardware implementation of the normalizer results in a current drain of approximately 1 mA (ie. 4×1500 gates×0.1944 MHz=~1 mA).

For the foregoing reasons, there is a need for a complex signal correlator and method therefor in TDMA cellular telephone systems that has lower hardware complexity and lower current drain than the prior techniques, while meeting the required specification for operation.

BRIEF DESCRIPTION OF THE DRAWINGS

FIG. 9 illustrates a block diagram of a conventional linear complex signal correlator.

DETAILED DESCRIPTION OF A PREFERRED EMBODIMENT

Figure 4:
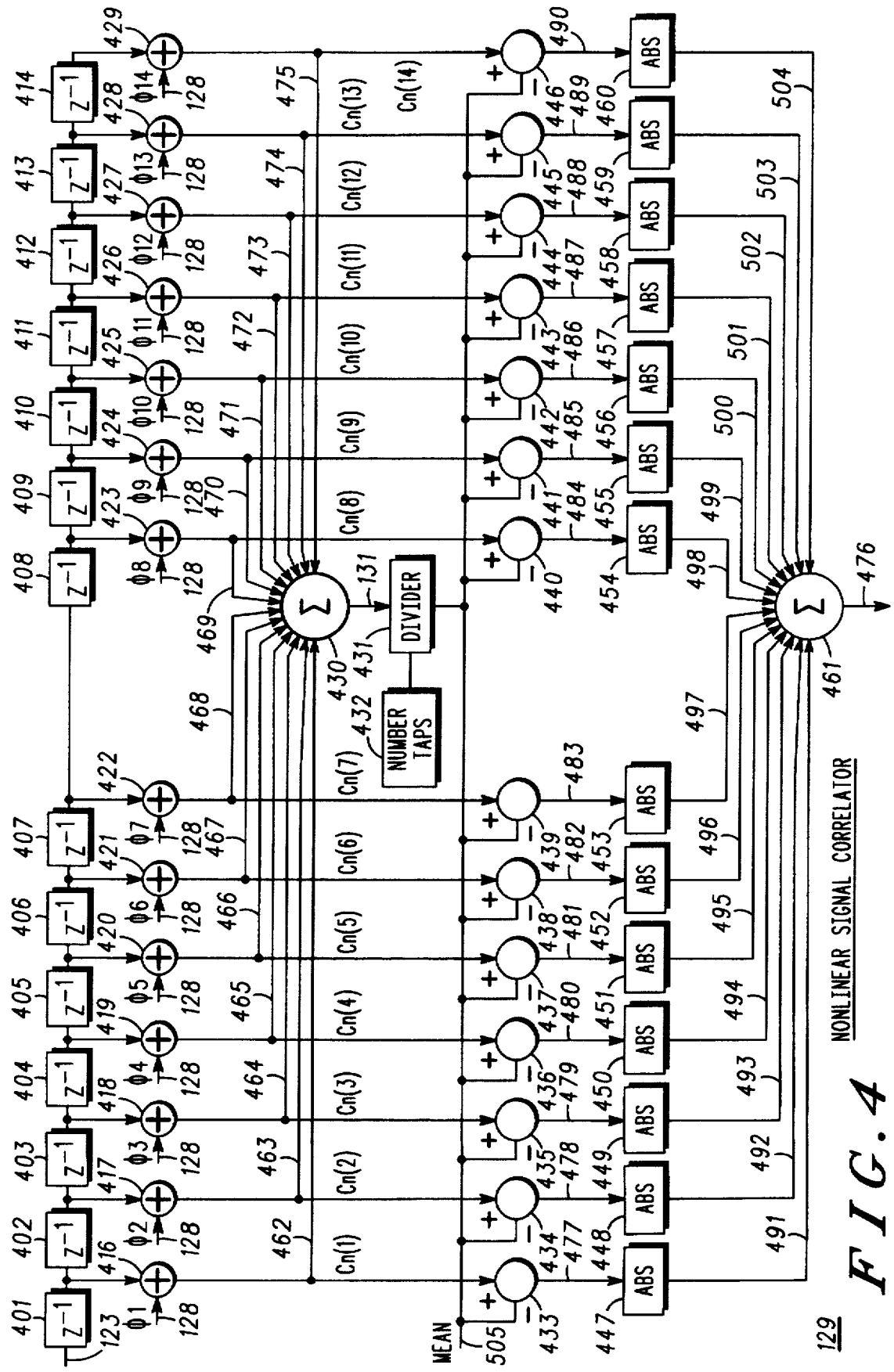
FIG. 4 illustrates a block diagram of a nonlinear complex signal correlator adapted for use with the communication unit of FIG. 1.

Generally, a nonlinear signal correlator 129 (FIG. 1) and method 550 (FIG. 5) therefor correlates a received signal 123 with a reference signal 128 to produce a correlation signal 476 (FIG. 4). The received signal 123 and the reference signal 128 are each represented by a first component and a second component. The second component of the received signal 123 and the second component of the reference signal 128 are combined at multiple points in time to produce samples of the correlation signal 462–475 (FIG. 4). The samples of the correlation signal 462–475 are summed to produce the correlation signal 476.

In the preferred embodiment, the received signal 123 and the reference signal 128 are complex signals. The first component and the second component comprise a magnitude component and a phase component, respectively. Combining is accomplished by adding the phase component of the received signal 123 and the phase component of the reference signal 128 at the multiple points in time to produce the samples of the correlation signal 462–475.

Conceptually, the nonlinear signal correlator 129 and method 550 and their advantages derive from the recognition that the majority of the information in the received signal 123 is included in the phase component. The nonlinear signal correlator 129 correlates the received signal 123 with the reference signal 128 by adding the phase component of the received signal 123 and the phase component of the reference signal 128, as performed in the present invention, rather than by multiplying the received signal 901 with the reference signal 902 (see FIG. 9), as performed in the prior art. A nonlinear signal correlator 129 is a correlator that uses some components of the received signal 123 to correlate while ignoring or limiting other components of the received signal 123.

Using adders 416–429 (see FIG. 4) in the nonlinear signal correlator 129 instead of the multipliers 935–938 (FIG. 9) in a conventional linear signal correlator 900 significantly reduces the complexity of hardware and current drain of the nonlinear signal correlator 129. The nonlinear signal correlator 129 achieves a hardware reduction of 95.3% ((27000–1260 gates)/27000 gates) and a current drain reduction of approximately 20 mA using EQ-4 (4×(27000–1260 gates)× 0.1944 MHz=~20 mA) when compared to a conventional linear signal correlator 900.

Figure 1:
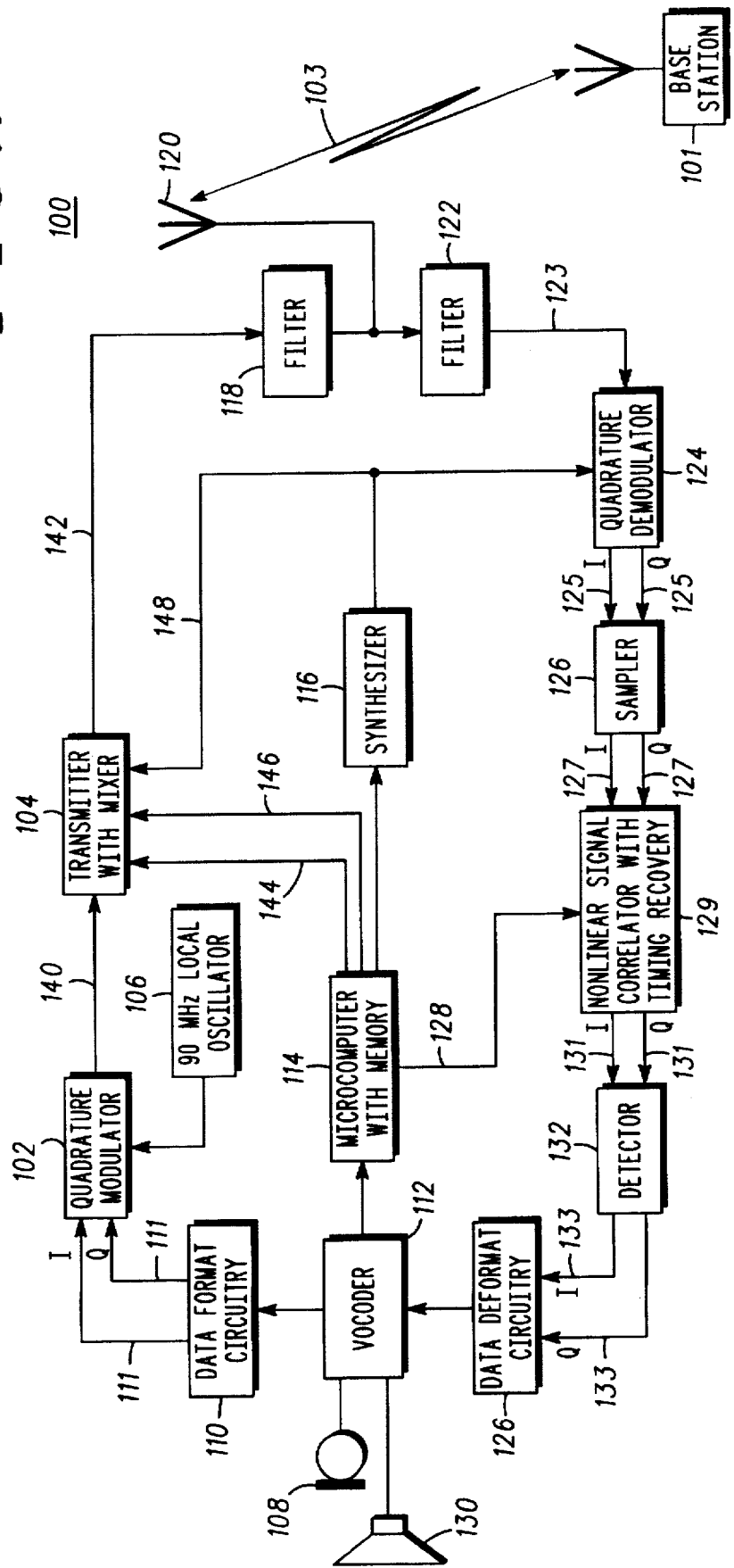
FIG. 1 illustrates a block diagram of a communication unit which may advantageously utilize a nonlinear signal correlator of FIG. 4.

Referring now to FIG. 1, FIG. 1 illustrates a block diagram of a communication unit 100 which may advantageously utilize a nonlinear signal correlator 129 shown in detail in FIG. 4. In the preferred embodiment, the communication unit 100 is a TDMA cellular telephone. An example of a TDMA cellular telephone that may utilize the present invention is a MICROTAC™ portable radiotelephone manufactured and available from Motorola Inc.

Figure 3:
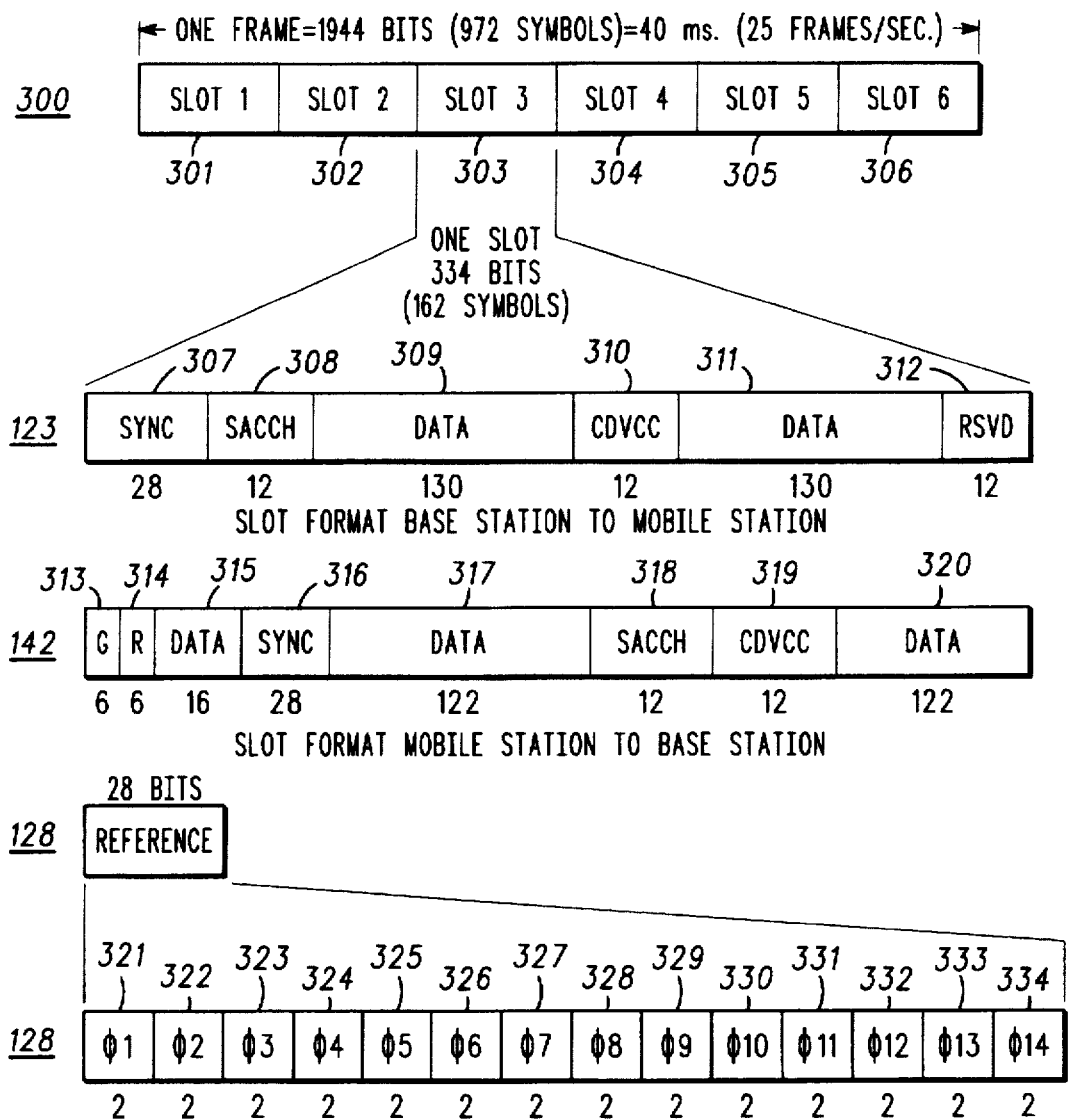
FIG. 3 illustrates signal formats for the received signal and the reference signal of FIG. 2 and adapted for use with the communication unit of FIG. 1.

A TDMA cellular telephone system 100 and 101 typically includes one or more base stations 101 which communicate bursts of digitally-encoded information 103 via radio frequency (RF) channels to active subscriber stations, such as the TDMA cellular telephone 100. Each burst 103 includes a plurality of time slots 301–306 (FIG. 3). During communication, the subscriber station 100 is assigned a time slot for the duration of that communication. The time slots are further described with reference to FIG. 3.

Figure 2:
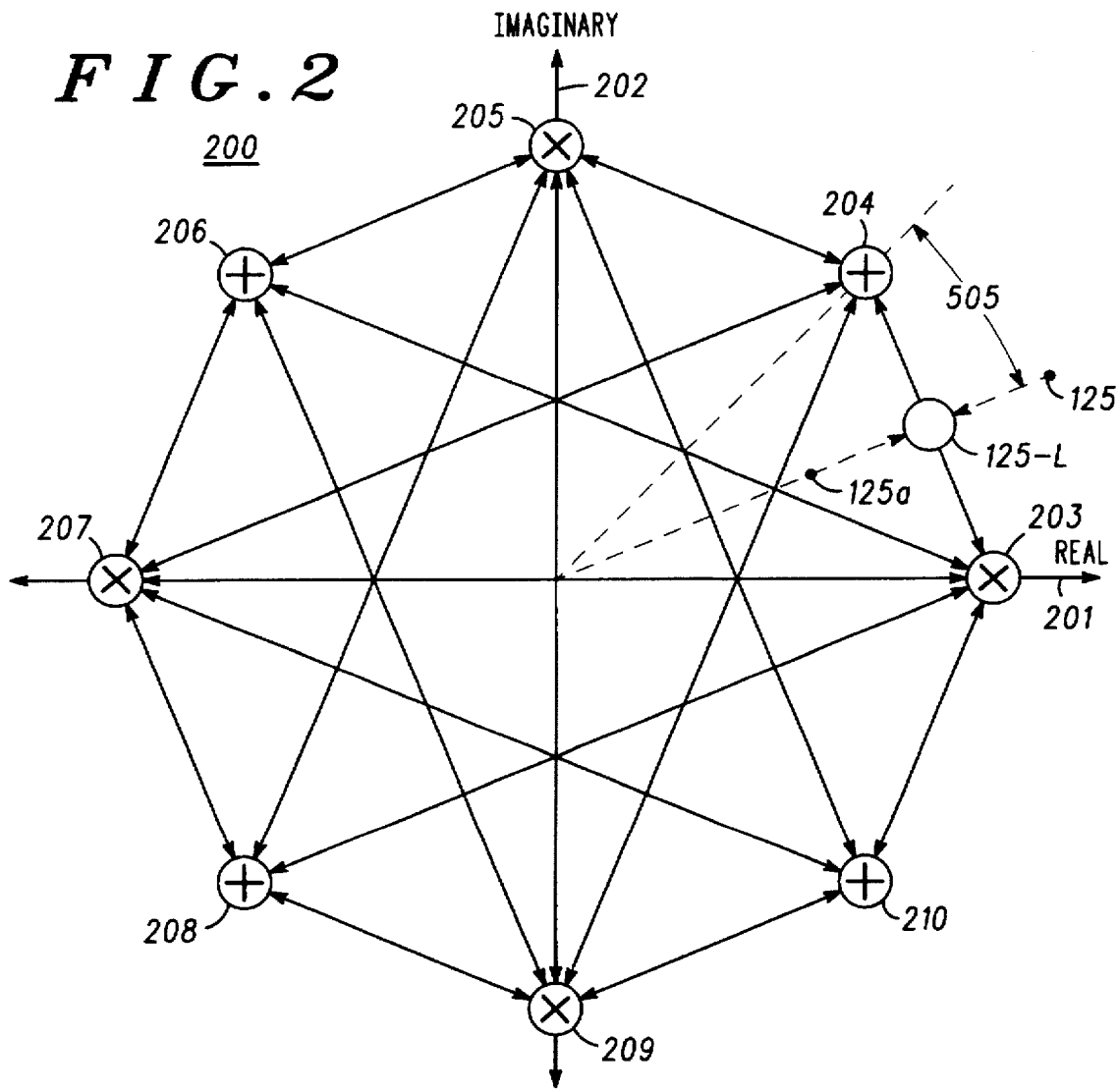
FIG. 2 illustrates a phase constellation of a received signal, a transmitted signal and a reference signal as complex signals and adapted for use with the communication unit of FIG. 1.

In the preferred embodiment, each burst 103 is modulated using a π/4 DQPSK (Differential Quadrature Phase Shift Keying) scheme 200 (FIG. 2). The a π/4 DQPSK signal is described herein with reference to FIGS. 2 and 3.

The TDMA cellular telephone 100 may be a mobile, handheld portable, or transportable telephone, each of which may in turn be coupled to a modem, facsimile machine, computer, or other device or system. The TDMA cellular telephone 100 is typically used for voice communications, but may also be used for data, video, other multimedia type signals, and the like. In general, the TDMA cellular telephone 100 communicates information.

The TDMA cellular telephone 100 includes, in its transmit signal path, a microphone 108, a vocoder 112, data format circuitry 110, a quadrature modulator 102, a 90 MHz local oscillator 106, a transmitter with mixer 104, a transmitter filter 118, and an antenna 120. In its receive signal path, the TDMA cellular telephone 100 includes the antenna 120, a receiver filter 122, a quadrature demodulator 124, a sampler 126, a nonlinear signal correlator 129, a detector 132, data deformat circuitry 126, the vocoder 112, and a speaker 130.

The channel frequency of the TDMA cellular telephone 100 is loaded into synthesizer 116 by microcomputer 114 and applied to transmitter 104 and demodulator 124. In the preferred embodiment, the duplex radio channels have transmit frequencies in the range from 824 MHz to 849 MHz and receive frequencies in the range from 869 MHz to 894 MHz.

The TDMA cellular telephone 100 is controlled by microcomputer 114 which includes a memory having a control and signaling computer program stored therein. In the TDMA cellular telephone 100, microcomputer 114 may be implemented with commercially available microcomputers, such as, for example, the Motorola type 68HC11 microcomputer.

In the TDMA cellular telephone 100 in FIG. 1, the transmitter with mixer 104 may be implemented as described in the instant assignee's U.S. Pat. No. 5,193,223, entitled "Power Control Circuitry For A TDMA Radio Frequency Transmitter", invented by Thomas J. Walczak et al. and granted Mar. 9, 1993 (incorporated herein by reference). The transmitter 104 includes power control circuitry comprised of variable gain stage, a mixer, a bandpass filter, and a directional coupler in a forward path, and a diode detector, an analog-to-digital converter, a digital controller, and a digital-to-analog converter in a feedback path.

The transmitter 104 is responsive to a timing signal 144, power level signals 146 and synthesizer output signal 148 for amplifying a transmit intermediate frequency (IF) signal 140 to produce a transmit output signal 142. Timing signal 144 has a waveform defining a series of transmit intervals, which correspond to one of three possible time slots 301, 302 and 303 for a TDMA RF channel as described herein with reference to FIG. 3.

During a cellular telephone call in the TDMA cellular system 100 and 101, the TDMA cellular telephone 100 is assigned to a TDMA RF channel and a time slot 303 of that channel for reception of a received signal 123 carrying voice signals 309 and 311, signaling information 308 and 310, and overhead information 307 and for transmission of the modulated transmit output signal 142 carrying voice signals 315, 317 and 320, signaling information 318 and 319, and overhead information 313, 314 and 315. (FIG. 3) For example, TDMA cellular telephone 100 may be assigned to time slot 303 of a particular channel. The transmit output signal 142 is transmitted at a desired power level selected by the power level signals 146 during each assigned time slot.

The operation of quadrature modulator 102 is represented by the equation:

$$V_{out}(t)=(I(t))\cos(2\pi ft)+(Q(t))\sin(2\pi ft)$$

where $V_{out}(t)$ is the modulated IF signal 140 and I(t) and Q(t) are I(k) and Q(k) as defined above as a function of time, and "f" is the transmit IF of 90 MHz.

In the TDMA cellular telephone 100 in FIG. 1, quadrature modulator 102 may be implemented as described in the instant assignee's U.S. Pat. No. 5,020,076, entitled "Hybrid Modulation Apparatus", invented by Stephen V. Cahill et al. and granted May 28, 1991 (incorporated herein by reference). Quadrature modulator 102 modulates TDMA RF signals with voice, data and signaling information according to π/4-shift differential quadrature phase shift keying (DQPSK). DQPSK modulation is described in "Digital Communications", by John G. Proakis, 1st Ed., ISBN 0-07-050927-1, at pages 171-178. The DQPSK modulation is described herein with reference to FIG. 2.

Data format circuitry 110 combines the output of vocoder 112 with signaling and overhead information and encodes the result according to π/4-shift DQPSK modulation into the transmit I and Q signals 111. The π/4-shift DQPSK modulation and signaling information is specified in the aforementioned EIA/TIA Interim Standard IS-54.

In TDMA cellular telephone 100 in FIG. 1, quadrature demodulator 124 may be implemented as described in the instant assignee's U.S. Pat. No. 5,150,384, entitled "A Carrier Recovery Method and Apparatus Having an Adjustable Response Time Determined by Carrier Signal Parameters", invented by Stephen V. Cahill, and granted Sep. 22, 1992 (incorporated herein by reference). Quadrature demodulator 124 demodulates TDMA RF received signals 123 modulated with information according to π/4-shift DQPSK and generates the receive I and Q signals 125.

The quadrature demodulator 124 is operatively coupled to receive the received signal 123 and adapted to demodulate the received signal 123 to produce the demodulated I and Q signals 125. The demodulated signals 125 are represented as a complex signal having I and Q components.

The sampler 126 is operatively coupled to receive the demodulated I and Q signals 125 and adapted to sample the demodulated I and Q signals 125 at multiple points in time to produce sampled I and Q signals 126. The sampler 126 is implemented as an analog-to-digital converter (ADC), for example Motorola DSP56ADC16. In the preferred embodiment, the sampling rate for the sampler 126 is designed to be at least two times the highest frequency component of the demodulated I and Q signals 125. The highest frequency component of the demodulated I and Q signals 125 in a TDMA cellular telephone 100 is typically 24.3 kHz. Therefore, in a TDMA cellular telephone 100 having a digital modulation signal represented by the π/4 DQPSK modulation scheme the sampling rate should be at least 48.6 kHz.

The memory in the microcomputer 114 stores the reference signal 128 therein. Both the received signal 123 and the reference signal 128 are complex signals. Complex signals are represented by real and imaginary components and are represented by a magnitude component and a phase component. The received signal 123 and the reference signal 128 are described herein with reference to FIGS. 2 and 3.

The nonlinear signal correlator 129 is operatively coupled to receive the sampled I and Q signals 127 and the reference signal 128 and adapted to correlate, at the multiple points in time, the sampled I and Q signals 127 with the reference signal 128 to produce a complex correlation signal 131. The nonlinear signal correlator 129 is described herein with reference to FIG. 4.

Figure 8:
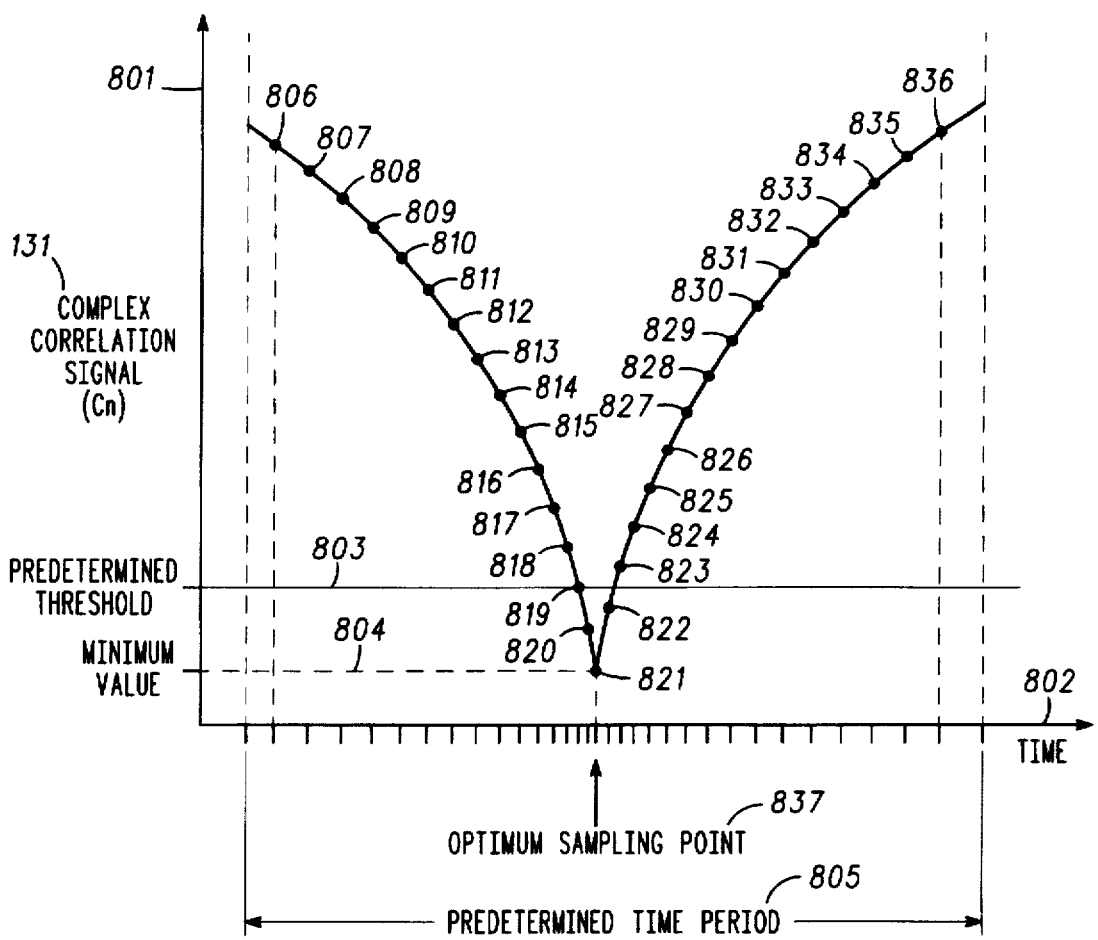
FIG. 8 illustrates a plot of magnitude versus time for a plurality of complex correlation signals generated by the nonlinear complex signal correlator of FIG. 4 and adapted for use with the communication unit of FIG. 1.

In the preferred embodiment, the nonlinear signal correlator 129 also includes post correlation processing for timing recovery. To achieve timing recovery, the nonlinear signal correlator selects a point in time corresponding to a desired complex correlation signal 821 of a plurality of complex correlation signals 806–836 (FIG. 8). A method of selecting the desired complex correlation signal 821 is described herein with reference to FIG. 8. Alternatively, the timing recovery could be done outside the nonlinear signal correlator 129, such as in the detector 132.

The detector 132 is operatively coupled to receive the correlated sampled I and Q signals 131 and adapted to produce a detected I and Q signals 133.

The detected I and Q signals 133 are deformated and decoded by data deformat circuitry 126 to recover the digitized voice signals, which are applied to vocoder 112. The vocoder 112 provides the acoustic speaker with decoded signals for the user to hear the received voice signals.

In TDMA cellular telephone 100 in FIG. 1, vocoder 112 may be implemented as described in the instant assignee's U.S. Pat. Nos. 4,817,157 and 4,896,361 (incorporated herein by reference). Vocoder 112 encodes and decodes voice signals according to code excited linear prediction (CELP) coding.

The filters 118 and 122 are intercoupled as a duplexer for transmitting TDMA RF signals on, and receiving TDMA RF signals from antenna 120. The filters 118 and 122 may be any suitable conventional filters, such as, for example, the filters described in U.S. Pat. Nos. 4,431,977, 4,692,726, 4,716,391, and 4,742,562 (incorporated herein by reference).

The vocoder 112, data format circuitry 110, data deformat circuitry 126, quadrature modulator 102, the detector 132, the sampler 126 and quadrature demodulator 124 may be implemented with commercially available digital signal processors (DSP), such as, for example, the Motorola type DSP 56000 digital signal processor.

FIG. 2 illustrates a phase constellation 200 of the received signal 123 and the reference signal 128 as complex signals and adapted for use with the TDMA cellular telephone 100 of FIG. 1. FIG. 2 generally illustrates real 201 and imaginary 202 axes and eight complex signal constellation points 203-210. The received signal 123 and the reference signal 128 are complex signals represented by real and imaginary components defined by the real axis 201 and the imaginary axes 202. Constellation points 203, 205, 207, 209 are located on axes 201 and 202 and constellation points 204, 206, 28, 210 are located off the axes 201 and 202. The information is differentially encoded; symbols are transmitted as changes in phase rather than absolute phases.

A signal vector representing the π/4-shift DQPSK modulation consists of a cosine component and a sine component. The signal scaling the amplitude of the cosine component is also known as the in-phase or I signal and the signal scaling the amplitude of the sine component is also known as the quadrature or Q signal. The I and Q scaled cosine and sine signals are the orthogonal quadrature components at the frequency of the 90 MHz signal from local oscillator 106; the modulated transmit IF signal 140 then being created by adding the I and Q signals. The I and Q scaled cosine and sine signals are the orthogonal quadrature components of the demodulated I and Q signals 125.

A particular received signal vector representing the demodulated I and Q signals 125 is shown in the constellation. By limiting the magnitude of the demodulated signal 125 the length of the signal vector is effectively shortened until the end of the signal vector reaches a value of one and is the process of interpolation. A value of one corresponds to a point on the unity circle. The limited demodulated signal 125 is designated as 125-L, for limited. Limiting the magnitude of the demodulated signal 125 may also be accomplished by simply ignoring the magnitude component of the demodulated signal vector when processing the demodulated signal vector. If the particular received signal vector representing the demodulated I and Q signals 125a is less than the unity circle, the demodulated signal will be lengthened to signal 125-L. This process is defined as extrapolation.

Symbols representing the vector components of the I and Q signals are generated in data format circuitry 110 by shifting the vector components such that phase shifts of IF signal 102 of ±π/4 or ±3π/4 radians are generated. Each phase shift encodes one of four possible symbols.

The data deformatting circuitry 126 performs the opposite function of the data format circuitry 110 by converting bit pairs into serial digital data. Each bit pair received specifies a symbol that is the desired vector shift related to the previously transmitted symbol.

Serial digital data from vocoder 112 that is eventually to be modulated by modulator 102 is first converted to bit pairs in data format circuitry 110. Each bit pair specifies a symbol that is the desired vector shift relative to the previously transmitted symbol.

The mapping of bit pairs to symbol vectors is according to the equations:

$$I(k)=I(k-1)\cos(\Delta\phi(X(k),Y(k)))-Q(k-1)\sin(\Delta\phi(X(k),Y(k)))$$

$$Q(k)=I(k-1)\sin(\Delta\phi(X(k),Y(k)))+Q(k-1)\cos(\Delta\phi(X(k),Y(k)))$$

where k is an index of the bit pairs; k=1 for bits one and two paired, k=2 for bits three and four paired, etc. I(k-1) and Q(k-1) are the amplitudes of the cosine and sine components of the previous symbol vector. X(k) represents the first bit of bit pair (k) and Y(k) represents the second bit of bit pair (k). The phase change, $\Delta\phi$, is determined according to the following table.

| X(k) | Y(k) | $\Delta\phi(X(k),Y(k))$ |
|---|---|---|
| 1 | 1 | $-3\pi/4$ |
| 0 | 1 | $3\pi/4$ |
| 0 | 0 | $\pi/4$ |
| 1 | 0 | $-\pi/4$ |

Thus, one of four possible symbols are transmitted for each two bits of the serial data stream.

The reason for the modulation nomenclature π/4-shift DQPSK and how it works is now evident: the phase shift is in π/4 increments in vector space, symbols are differentially encoded with respect to the previous symbol vector, and the information bearing quantity in transmit IF signal 140 is the phase-shift with one of four possible shifts between any two symbols.

In the preferred embodiment of the present invention, eight constellation points having unity amplitude are used. However, in other applications, utilizing other modulation schemes, such as quadrature amplitude modulation, having multiple phase and amplitudes, may advantageously use the present invention. This invention particularly favors phase modulated systems.

In the preferred embodiment of the present invention, the nonlinear signal correlator 129 is implemented in a subscriber cellular telephone. The present invention is not limited only to subscriber products, but may also be used in fixed site stations or base stations, base station 101 in FIG. 1, for example.

FIG. 3 illustrates signal formats for the received signal 123, the transmitted signal 142 and the reference signal 128 of FIG. 2 and adapted for use with the communication unit of FIG. 1. The structure of the data traffic channel structure for a TDMA RF channel is described in the EIA/TIA Interim Standard IS-54, paragraph 1.2.

The frame length of each digital TDMA RF channel 300 shall be 40 milliseconds. Each frame shall consist of six equally sized time-slots 301-306, exactly 162 symbols in length. Each full rate traffic channel shall utilize two equally spaced time slots in the frame slots 1 and 4 (301 and 304), slots 2 and 5 (302 and 305), or slots 3 and 6 (303 and 306).

The slot format 123 for the received signal sent from the base station to the mobile station has the same reference number as the received signal 123 itself. SYNC 307 is used for synchronization and training (See the EIA/TIA Interim Standard IS-54, paragraph 1.2.4). SACCH 308 represents the slow associated control channel. (See the EIA/TIA Interim Standard IS-54, paragraph 2.7.3.1.2 and 3.7.3.1.2) DATA 309 and 311 is user information or FACCH. CDVCC 310 is coded digital verification color code. RSVD 312 represent reserved bits. (See the EIA/TIA Interim Standard IS-54, paragraph 1.2.2, 2.4.3 and 3.4.3)

The slot format 142 for the transmitted signal 142 sent from the mobile station to the base station has the same reference number as the received signal 142 itself. "G" 313 is the guard time. "R" 314 is the ramp time. (For "G" and "R" see the EIA/TIA Interim Standard IS-54, paragraph 1.2.3) SACCH, CDVCC and RSVD are the same as for the received signal 123.

The slot format 128 for the reference signal 128 has the same reference number as the reference signal 128 itself. The reference signal 128 has 28 bit to equal the number of bits in the SYNC word 307. These 28 bits are stored in the memory of the microcomputer 114 in FIG. 1. Each adjacent pair of the 28 bits in the reference signal 128 represents a symbol. The reference signal 128 has fourteen symbols 321-334. According to the preferred embodiment, the reference signal 128 only needs phase information, since the nonlinear correlator 129 of FIG. 1 correlates by adding the phases of the received signal 123 and the reference signal 128. The magnitude of the fourteen symbols 321-334 can be assumed to be one or unity or ignored.

The present invention is used for timing recovery. Timing recovery is gained by correlating the SYNC 307 of the received signal with the reference signal 128. Choosing an optimal sampling point for timing recovery utilizing the present invention is described herein with reference to FIG. 8.

FIG. 4 illustrates a block diagram of the nonlinear complex signal correlator 129 adapted for use with the TDMA cellular telephone 100 of FIG. 1. The nonlinear signal correlator 129 generally includes a plurality of taps 401-414, a plurality of combiners or adders 416-429, a first summer 430, a divider 431, a plurality of subtractors 433-446, a plurality of absolute value determiners 447-460, and a second summer 461.

The nonlinear signal correlator 129 correlates the received signal 123 with the reference signal 128 to produce a correlation signal 131. The received signal 123 and the reference signal 128 are each represented by at least a first component and a second component. In the preferred embodiment, the received signal 123 and the reference signal 128 are complex signals. The first component and the second component comprise a magnitude component and a phase component, respectively.

The plurality of taps 401-414 are adapted to delay the received signal 123 at multiple points in time. In the preferred embodiment, the delay of the taps 401-414 are one symbol time. In the preferred embodiment, a predetermined number of the plurality of taps 401-414 correspond to a predetermined number of symbols 321-334 (FIG. 3) in the reference signal 128. Therefore, the number of taps in this case is fourteen.

The plurality of combiners 416-429 are operatively coupled to the plurality of taps 401-414, respectively, and adapted to combine the second component of the received signal 123 and the second component of the reference signal 128 at the multiple points in time to produce samples of the correlation signal 462-475. In the preferred embodiment, the plurality of combiners 416-429 comprise a plurality of adders 416-429 adapted to add the phase component of the received signal 123 and the phase component of the reference signal 128 at the multiple points in time to produce the samples of the correlation signal 462-475.

The first summer 430 is operatively coupled to the plurality of combiners or adders 416-429 and adapted to sum the samples of the correlation signal 462-475 to produce the correlation signal 131.

In summary of the primary features of the preferred embodiment, the received signal 123 and the reference signal 128 are complex signals each represented by a magnitude component and a phase component. The plurality of taps 401-414 are adapted to delay the received signal 123 at multiple points in time. The plurality of adders 416-429 are operatively coupled to the plurality of taps 401-414, respectively, and adapted to add the phase component of the received signal 123 and the phase component of the reference signal 128 at the multiple points in time to produce samples of the complex correlation signal 462-475. The first summer 430 is operatively coupled to the plurality of adders 416-429 and adapted to sum the samples of the complex correlation signal 462-475 to produce the complex correlation signal.

Correlation signal 131 represents the output of the nonlinear signal correlator 129 in FIG. 1. The correlation signal 131 is reliable and meets the requirements of the TDMA cellular telephone 100, while the nonlinear signal correlator offers a significant hardware reduction and current drain savings over the prior art. However, additional features of the nonlinear signal correlator 129 provide an even better correlation signal.

One of these features is to remove a bias from the samples of the complex correlation signal 462-475. The bias is caused by any or all of the following: unknown initial phase, frequency offset, timing jitter, and any channel irregularities. The bias is shown in FIG. 2 as the phase offset 505. If the bias is left on the correlated signal 131, the resulting effect would cause an unknown correlation signal 131 which could result in a lost synchronization. The advantage of removing the bias 505 is the synchronization would be able to be determined with much less error.

Another one of these features is to make the samples of the complex correlation signal 462-475 positive. The uncertain polarity of the samples of the complex correlation signal 462-475 is caused by the subtraction of the bias 505 from the samples of the complex correlation signal 462-475. If the uncertain polarity is left with the correlated signal 131, the resulting effect could cancellation of the samples of the complex correlation signal 462-475 resulting in a false detect. The advantage of making the polarity positive is elimination of the cancellation of the samples of the complex correlation signal 462-475.

The two features just mentioned can be used separately or together. In the preferred embodiment, they are used together as shown in FIG. 4.

The first feature is now explained. The following discussion considers the bias determiner 431 and the plurality of subtractors 433-446 but not the plurality of absolute value determiners 447-460. The bias determiner 431 is operatively coupled to the first summer 430 and adapted to determine the bias 505 of the complex correlation signal 131 responsive to a number of the plurality of taps 432. In the preferred embodiment, the bias 505 comprises a mean value of the complex correlation signal 131. In the preferred embodiment, the bias determiner 431 comprises an averager or a divider operatively coupled to the first summer 430 and adapted to average the complex correlation signal 131 over the predetermined number of the plurality of taps 432.

The plurality of subtractors 433-446 are operatively coupled to the bias determiner 431 and the plurality of adders 416-429, respectively, and adapted to subtract the bias 505 from each of the samples of the complex correlation signal 462-475 to produce unbiased samples of the complex correlation signal 477-490.

The second summer 461 is operatively coupled to the plurality of subtractors 433-446 and is adapted to sum the unbiased samples of the complex correlation signal 477-490 to produce an unbiased complex correlation signal 476. In this case, the plurality of absolute value determiners 447-460 were not used.

The second feature is now explained. The following discussion considers the plurality of absolute value determiners 447-460 but not the bias determiner 431 and the plurality of subtractors 433-446. The plurality of absolute value determiners 447-460 are operatively coupled to the plurality of adders 416-429, respectively, and adapted to determine an absolute value of each of the samples of the complex correlation signal 462-475 to produce positive samples of the complex correlation signal 491-504. The second summer 461 is operatively coupled to the plurality of absolute value determiners 447-460 and adapted to sum the positive samples of the complex correlation signal 491-504 to produce a positive complex correlation signal 476.

In summary of the preferred embodiment of the present invention as completely shown in FIG. 4, the nonlinear signal correlator 129 correlates the received signal 123 with the reference signal 128 to produce an unbiased positive complex correlation signal 476. The received signal 123 and the reference signal 128 are complex signals each represented by a magnitude component and a phase component. The plurality of taps 401-414 are adapted to delay the received signal 123 at multiple points in time. The predetermined number of the plurality of taps 401-414 corresponds to the predetermined number of symbols in the reference signal 128. The plurality of adders 416-429 are operatively coupled to the plurality of taps 401-414, respectively, and adapted to add the phase component of the received signal 123 and the phase component of the reference signal 128 at the multiple points in time to produce samples of the complex correlation signal 462-475. The first summer 430 is operatively coupled to the plurality of adders 416-429 and adapted to sum the samples of the complex correlation signal 462-475 to produce the complex correlation signal 131. The averager or divider 431 is operatively coupled to the first summer 430 and adapted to average a mean value 505 of the complex correlation signal 131 responsive to a number of the plurality of taps 432. The plurality of subtractors 433-446 are operatively coupled to the averager 431 and the plurality of adders 416-429, respectively, and adapted to subtract the mean value 505 from each of the samples of the complex correlation signal 462-475 to produce unbiased samples of the complex correlation signal 477-490. The plurality of absolute value determiners 447-460 are operatively coupled to the plurality of subtractors 433-446, respectively, and adapted to determine an absolute value of each of the unbiased samples of the complex correlation signal 477-490 to produce positive unbiased samples of the complex correlation signal 491-504. The second summer 461 is operatively coupled to the plurality of absolute value determiners 447-460 and adapted to sum the positive unbiased samples of the complex correlation signal 491-504 to produce the positive unbiased complex correlation signal 476.

The following discussion focuses on the plurality of adders 416-429 and their relationship to the nonlinear signal correlator 129 of the present invention. A transformation into the phasor system of a typical complex correlation step is shown in EQ-5 below where "*" denotes complex conjugate, "| |" denotes the absolute value, and "<" represents the phase of the argument.

$$Cn\_step = |Rx(kt)|\exp\{<Rx(kT)\} * |S(kT)|\exp\{<S(kT)\} = |Rx(kT)| \times |S(kT)|\exp\{<n(kT)-<S(kT)\} \quad \text{EQ-5}$$

Ideally the multiplication of the magnitudes of the received signal Rx(kT) and reference signal S(kT) should be unity for a π/4 DQPSK modulation system since under ideal conditions the received signal should fall on the unity circle. Timing offsets, frequency offset, noise, delay spread and fading are some of the contributors to the distortion of the received signal. By interpolating/extrapolating the distorted signal vector to the unit circle (i.e. setting the magnitude of the complex correlation step signal output to 1), the remainder of EQ-5 is just the addition of the phases of the two signals as shown below in EQ-6:

$$|Rx(kT)| \times |S(kT)| = 1 => Cn\_step = 1 \exp\{<Rx(kT)-<S(kT)\} \quad \text{EQ-6:}$$

Using the nonlinear signal correlator 129 of the present invention, then each correlation step has just one adder as opposed to the four multipliers 935-938 and two adders 939 and 940 (FIG. 9). This FIG. 4 shows the preferred implementation of a reduced complexity nonlinear signal correlator using adders 416-429.

The nonlinear signal correlator 129 of the present invention adds the phases of the received signal 123 Rx(kT) and the reference signal 128 S(kT) to provide a substantially equivalent complex correlation step as that shown in EQ-5 by the prior art. This interpolation/extrapolation operation is justified due to the π/4 DQPSK modulation scheme implemented as well recognizing that the majority of information encoded is in the phase of the received signal 123.

By ignoring the magnitude of the received signal 123, the nulled signal power received from a fading channel does not contribute to the correlation peak magnitude to the extent apparent in the conventional linear complex correlation method. Therefore, the normalizing operations are eliminated which also reduces the hardware required and thereby reducing current drain.

The number of Motorola Standard Cell Gates needed to implement the nonlinear signal correlator 129 as shown in FIG. 4 in hardware is 1,260 gates resulting in a current drain of less than 1 mA from EQ-4 (4 * 1260 gates * 0.1944 MHz—1 mA). When compared to the linear correlator of the prior art as shown in FIG. 9 the nonlinear signal correlator 129 results in a reduction of 95.3% ((27000 gates−1260 gates)/27000 gates=95.3%) in hardware real estate and over 20 mA (from EQ-4: 4*(27000 gates−1260 gates) * 0.1944 MHz=~20 mA) reduction in current drain. These results are significant in light of the cost sensitivity and battery life of portable communication products, such as cellular telephones.

In summary, the steps of correlating using the nonlinear correlator 129 are primarily performed by adding the phases of the complex signals rather than by multiplying the complex signals. The nonlinear correlator 129 using simple binary adders to implement a hardware signal correlator is much less complex and uses much less current than the linear correlator 900 of the prior art using multipliers and adders. This required realization that the correlation does not require all of the information of the received signal 123. By interpolating/extrapolating the magnitude of the correlation samples, the entire complex correlation operation is reduced to the addition of the phases of the received signal 123 and the reference signal 128.

Figure 5:
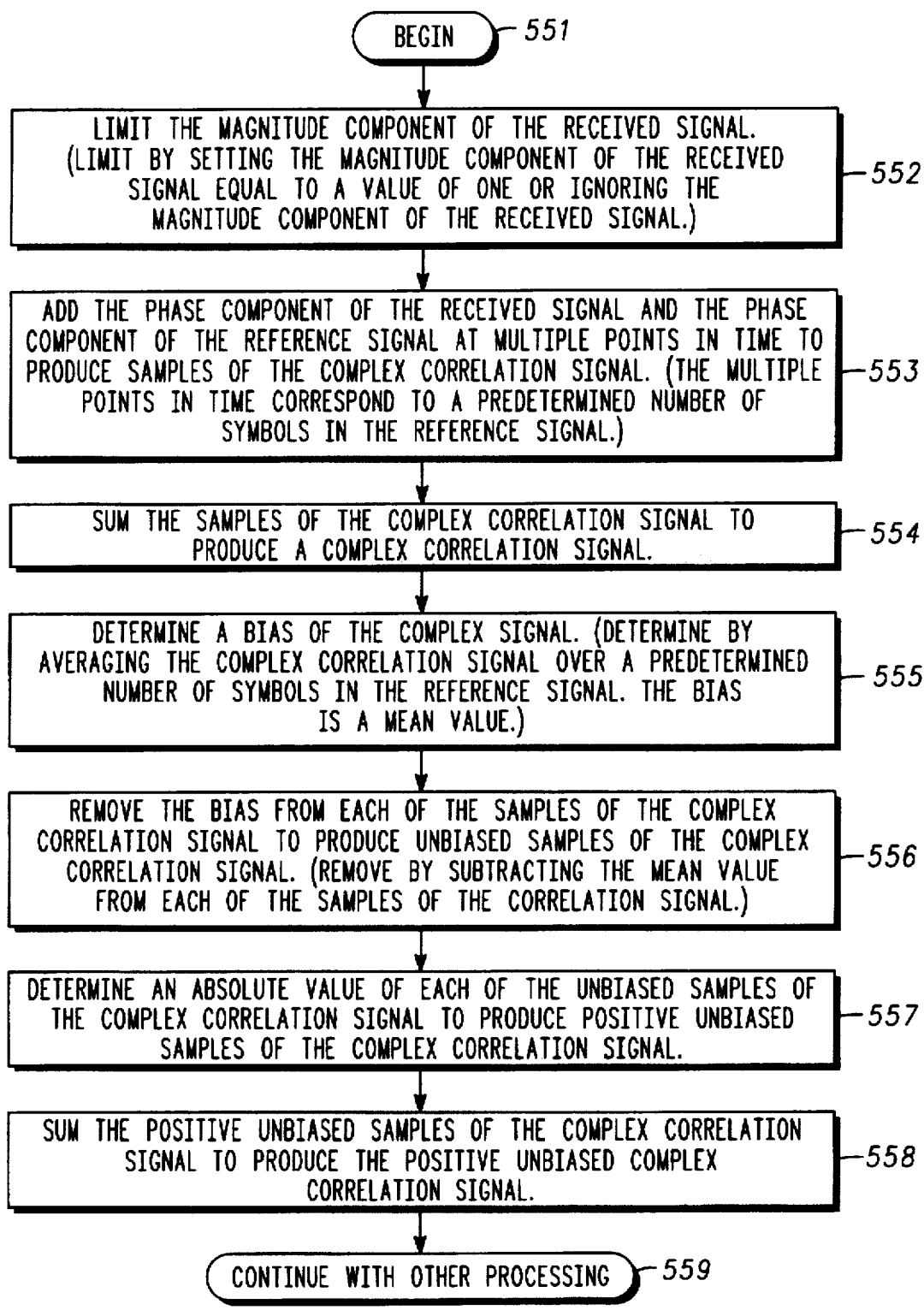
FIG. 5 illustrates a flowchart describing the operation of the nonlinear complex signal correlator of FIG. 4.

FIG. 5 illustrates a flowchart 550 describing the operation of the nonlinear complex signal correlator 129 of FIGS. 1 and 4. The flowchart 550 describes a method for correlating the received signal 123 with the reference signal 128 to produce a positive unbiased complex correlation signal 476. The received signal 123 and the reference signal 128 are complex signals each represented by a magnitude component and a phase component. At step 551 the method begins.

At step 552 the magnitude component of the received signal 123 is limited. In the preferred embodiment, the step 552 of limiting is accomplished by setting the magnitude component of the received signal 123 equal to a value of one. Alternatively, the step 552 of limiting may be accomplished by ignoring the magnitude component of the received signal 123.

At step 553 the phase component of the received signal 123 and the phase component of the reference signal 128 are added at multiple points in time to produce samples of the complex correlation signal 462–475. In the preferred embodiment, the multiple points in time correspond to a predetermined number of symbols in the reference signal 128.

At step 554 the samples of the complex correlation signal 462–475 are summed to produce a complex correlation signal 131.

At step 555 a bias 505 of the complex correlation signal 131 is determined. In the preferred embodiment, the bias is a mean value 505. In the preferred embodiment, the step 555 of determining the mean value 505 of the complex correlation signal 131 is accomplished by averaging the complex correlation signal 131 over a predetermined number of symbols 432 in the reference signal 128.

At step 556 the bias 505 from each of the samples of the complex correlation signal 462–475 is removed to produce unbiased samples of the complex correlation signal 477–490. In the preferred embodiment, the bias 505 is removed by subtracting 433–446 the mean value 505 from each of the samples of the complex correlation signal 462–475.

At step 557 an absolute value 447–460 of each of the unbiased samples of the complex correlation signal 477–490 is determined to produce positive unbiased samples of the complex correlation signal 491–504.

At step 558 the positive unbiased samples of the complex correlation signal 491–504 are summed to produce the positive unbiased complex correlation signal 476.

At step 559 the flowchart continues with other processing.

Figure 6:
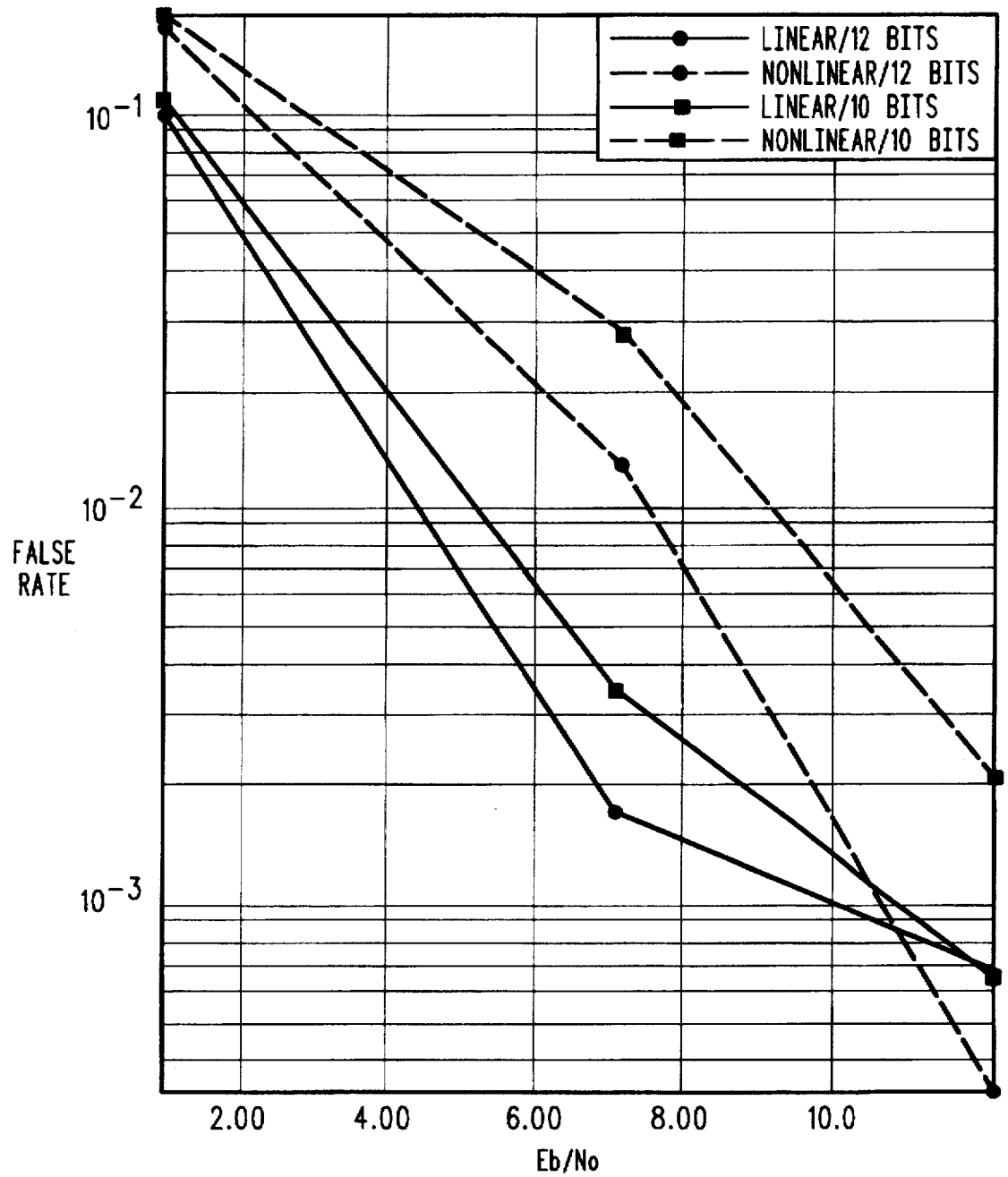
FIG. 6 illustrates a graph of false rate versus signal to noise ratio at one symbol delay, for example, for the nonlinear complex signal correlator of FIG. 4 and a conventional linear complex signal correlator of FIG. 9.
Figure 7:
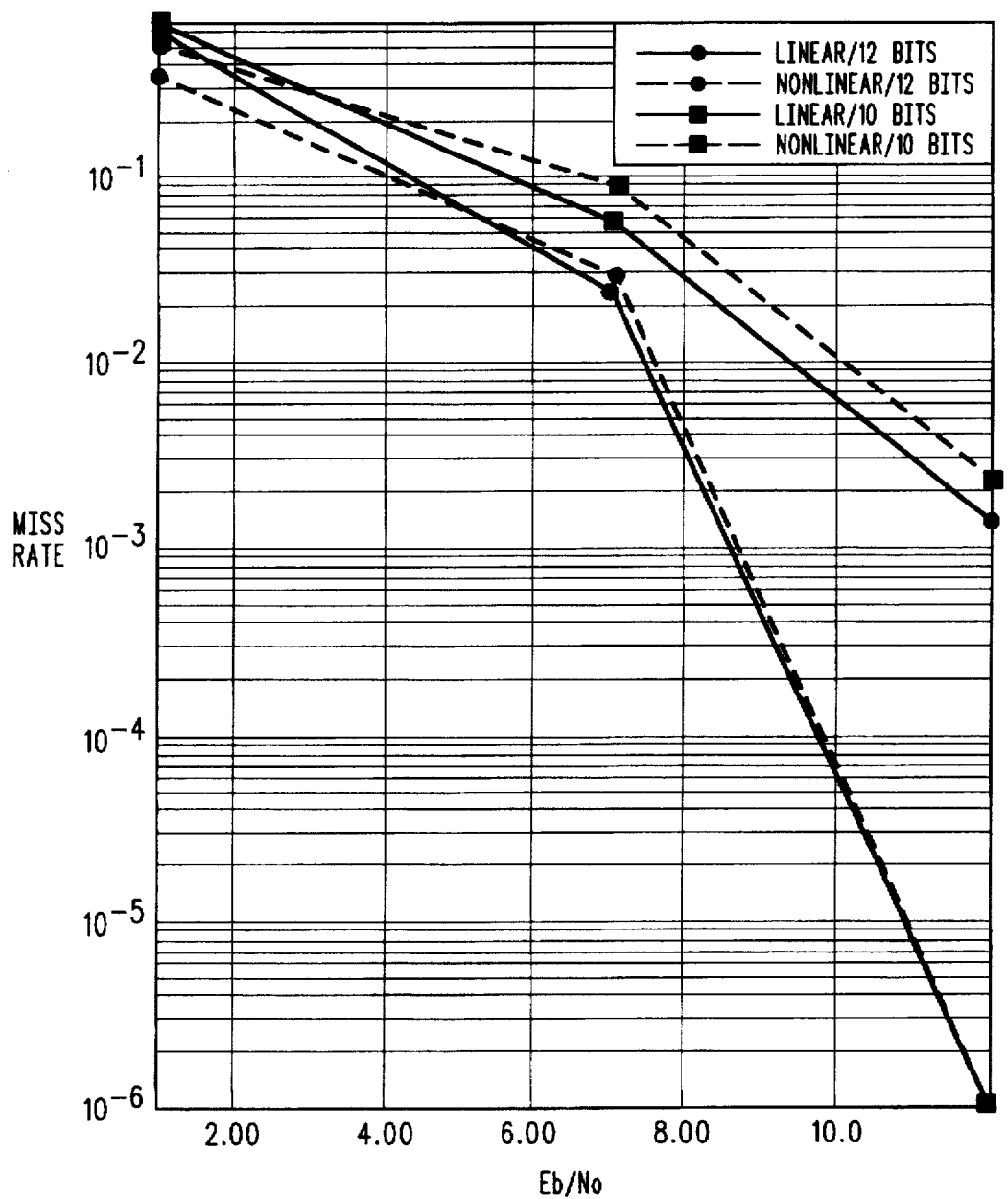
FIG. 7 illustrates a graph of miss rate versus signal to noise ratio at one symbol delay, for example, for the nonlinear complex signal correlator of FIG. 4 and the conventional linear complex signal correlator of FIG. 9.

FIGS. 6 and 7 are described together to present practical performance measurements of the nonlinear correlator 129 as shown in FIGS. 1 and 4. FIG. 6 illustrates a graph of false rate versus signal to noise ratio at one symbol delay, for example, for the nonlinear complex signal correlator of FIG. 4 and a conventional linear complex signal correlator of FIG. 9. FIG. 7 illustrates a graph of miss rate versus signal to noise ratio at one symbol delay, for example, for the nonlinear complex signal correlator of FIG. 4 and the conventional linear complex signal correlator of FIG. 9.

A large amount of data was taken when reducing the present invention to practice. For example, data was taken for different signal to noise ratios (SNR) and channel conditions. The graphs for one symbol delay are presented as an example only. Therefore, a relative comparison between the performance of the nonlinear signal correlator 129 and the performance of the linear signal correlator of FIG. 9 will be summarized under various conditions without the attachment of many tables and graphs.

Signal correlator performance is rated by false rate and miss rate. False rate is the ratio of false sync word detects to the total number of slots. The miss rate is the number of correlator peaks below a predetermined threshold and is related to the "dropping" of sync. The performance of the nonlinear correlator of the present invention is shown in comparison with the conventional linear complex correlator with normalization in FIGS. 6 and 7. The data gathered for each point shown in a graph is over a minimum of 3000 time slots.

Correlator performance is related to fixed point precision. Fixed point precision is the number of binary digits (bits) required to represent a given number.

A symbol delay is a channel model which is the result of the transmitted signal path having 2 rays; where one of the rays is delayed by one symbol relative to the other transmitted ray, and where both rays are combined at the receiver to produce a received signal which has inter symbol.

The linear correlator falsing rate is 3 to 5 dB better than the nonlinear correlator for static and delay spread channels for the higher precision of 10 and 12 bits as seen in FIGS. 6 and 7. Under fading channel conditions, the linear correlator only performs better with 12 bits of precision, otherwise, the nonlinear correlator performs better independent of the precision as seen in FIG. 7.

The miss rate is almost identical for both correlators in all conditions and fixed point precisions. It is of interest to note that the false rate is more sensitive to reduction in precision than the miss rate. All miss rate curves are grouped in a small area while the false rate curves fluctuate throughout the graph dependent upon the fixed point precision.

It is important to note that the above results are reflective of the linear correlator used in conjunction with normalization. If normalization is not used the miss rate performance in fading channels of the linear correlator degrades by 50%. This shows the dependency of the linear correlator on the magnitude of the received signal. Since fading affects magnitude more than phase, a nonlinear correlator using only phase information is more resilient in fading conditions than the linear correlator using both magnitude and phase information without normalization.

Simulation results show the nonlinear phase correlator exhibiting small differences in false rate performance among the precision measurements in the static and delay spread conditions in comparison to linear complex correlation approach. Hence, a nonlinear correlator can have less precision and still maintain good false rate performance.

Moreover, due to the fact that correlation only needs to find a peak, exact precision is not required. Therefore, the little improvement gained by using the linear correlator with normalization is not justified with the large cost, size and current drain burden associated with its hardware implementation.

FIG. 8 illustrates a plot of magnitude 801 versus time 802 for a plurality of complex correlation signals 806–836 generated by the nonlinear complex signal correlator 129 of FIG. 4 and adapted for use with the TDMA cellular telephone 100 of FIG. 1.

An optimum point in time 837 for sampling the received signal 123 is determined by illustration in FIG. 8. The received signal 123 and a reference signal 128 are complex signals each represented by a magnitude component and a phase component. A method for determining an optimum point in time 837 comprises the steps of repeating the steps 553 through 558 of FIG. 5 for a predetermined period of time 805 to produce a plurality of complex correlation signals 806–836. A desired complex correlation signal 821 is determined from among the plurality of complex correlation signals 806–836. When the desired complex correlation signal 821 is favorable, the point in time 837 corresponding to the desired complex correlation signal 821 is selected. When the desired complex correlation signal 821 is unfavorable, the point in time 837 corresponding to the desired complex correlation signal 821 is disregarded.

In the preferred embodiment, the step of determining the desired complex correlation signal 821 further comprising the steps of comparing the plurality of complex correlation signals 806–836 to one other; and determining the desired complex correlation signal 821 as the complex correlation signal having a minimum value 804 from among the plurality of complex correlation signals 806–836 responsive to the step of comparing.

Alternatively, the desired complex correlation signal 821 is determined to be favorable when the desired complex correlation signal 821 is less than a predetermined threshold 803; and the desired complex correlation signal 821 is determined to be unfavorable when the desired complex correlation signal 821 is greater or equal to the predetermined threshold value 803.

The nonlinear signal correlator of the present invention advantageously substitutes one adder per tap as shown in FIG. 4 for the four multipliers and two adders per tap needed in the prior art complex signal correlators as shown in FIG. 9. This substitution significantly reduces the complexity of the nonlinear signal correlator 129 of the present invention over prior art linear complex signal correlators by approximately 95% which yields a current drain savings of about 20 mA. The significant complexity reduction results in a lower parts count which reduces cost, space and current drain of the nonlinear complex signal correlator. The complexity reduction is accomplished by recognizing that correlation does not require all of the information of the received signal 123. By interpolating/extrapolating the magnitude of the correlation samples to unity gain, the entire complex correlation operation is reduced to the addition of the phases of the received signal 123 and the reference signal 128. For the customer of cellular telephone products these advantages result in a cheaper and smaller product with longer talk time.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. A method for correlating a received signal with a reference signal to produce a correlation signal, wherein the received signal and the reference signal are each represented by at least a first component and a second component, the method comprising the steps of:

combining the second component of the received signal and the second component of the reference signal at multiple points in time to produce samples of the correlation signal; and summing the samples of the correlation signal to produce the correlation signal.

2. A method according to claim 1 further comprising the step of:

limiting at least the first component of the received signal.

3. A method according to claim 2 wherein the step of limiting comprises the step of setting the first component of the received signal equal to a value of one.

4. A method according to claim 1:

wherein the received signal and the reference signal are complex signals;

wherein the first component and the second component comprise a magnitude component and a phase component, respectively; and wherein the step of combining further comprises the step of adding the phase component of the received signal and the phase component of the reference signal at the multiple points in time to produce the samples of the correlation signal.

5. A method according to claim 1 further comprising the steps of:

determining a bias of the correlation signal;

removing the bias from each of the samples of the correlation signal to produce unbiased samples of the correlation signal; and summing the unbiased samples of the correlation signal to produce an unbiased correlation signal.

6. A method according to claim 5:

wherein the bias comprises a mean value; and wherein the step of determining the mean value of the correlation signal comprises the step of averaging the correlation signal over a predetermined number of symbols in the reference signal.

7. A method according to claim 1 further comprising the steps of:

determining an absolute value of each of the samples of the correlation signal to produce positive samples of the correlation signal; and summing the positive samples of the correlation signal to produce a positive correlation signal.

8. A method according to claim 1 wherein the multiple points in time correspond to a predetermined number of symbols in the reference signal.

9. A method for correlating a received signal with a reference signal to produce a complex correlation signal, wherein the received signal and the reference signal are complex signals each represented by a magnitude component and a phase component, the method comprising the steps of:

adding the phase component of the received signal and the phase component of the reference signal at multiple points in time to produce samples of the complex correlation signal; and summing the samples of the complex correlation signal to produce the complex correlation signal.

10. A method according to claim 9 further comprising the step of:

setting the magnitude component of the received signal equal to a value of one.

11. A method according to claim 9 further comprising the steps of:

determining a bias of the complex correlation signal;

removing the bias from each of the samples of the complex correlation signal to produce unbiased samples of the complex correlation signal; and summing the unbiased samples of the complex correlation signal to produce an unbiased complex correlation signal.

12. A method according to claim 11:

wherein the bias is a mean value;

wherein the step of determining the mean value of the complex correlation signal comprises the step of averaging the complex correlation signal over a predetermined number of symbols in the reference signal.

13. A method according to claim 9 further comprising the step of:
   determining an absolute value of each of the samples of the complex correlation signal to produce positive samples of the complex correlation signal; and
   summing the positive samples of the complex correlation signal to produce a positive complex correlation signal.

14. A method according to claim 9 wherein the multiple points in time correspond to a predetermined number of symbols in the reference signal.

15. A method for correlating a received signal with a reference signal to produce a positive unbiased complex correlation signal, wherein the received signal and the reference signal are complex signals each represented by a magnitude component and a phase component, the method comprising the steps of:
   adding the phase component of the received signal and the phase component of the reference signal at multiple points in time to produce samples of the complex correlation signal;
   summing the samples of the complex correlation signal to produce a complex correlation signal;
   determining a bias of the complex correlation signal;
   removing the bias from each of the samples of the complex correlation signal to produce unbiased samples of the complex correlation signal;
   determining an absolute value of each of the unbiased samples of the complex correlation signal to produce positive unbiased samples of the complex correlation signal; and
   summing the positive unbiased samples of the complex correlation signal to produce the positive unbiased complex correlation signal.

16. A method according to claim 15 further comprising the step of:
   setting the magnitude component of the received signal equal to a value of one.

17. A method according to claim 15:
   wherein the bias is a mean value; and
   wherein the step of determining the mean value of the complex complex correlation signal comprises the step of averaging the complex correlation signal over a predetermined number of symbols in the reference signal.

18. A method according to claim 15 wherein the multiple points in time correspond to a predetermined number of symbols in the reference signal.

19. A nonlinear signal correlator for correlating a received signal with a reference signal to produce a correlation signal, wherein the received signal and the reference signal are each represented by at least a first component and a second component, the nonlinear signal correlator comprising:
   a plurality of taps adapted to delay the received signal at multiple points in time;
   a plurality of combiners operatively coupled to the plurality of taps, respectively and adapted to combine the second component of the received signal and the second component of the reference signal at the multiple points in time to produce samples of the correlation signal; and
   a first summer operatively coupled to the plurality of combiners and adapted to sum the samples of the correlation signal to produce the correlation signal.

20. A nonlinear signal correlator according to claim 19:
   wherein the received signal and the reference signal are complex signals;
   wherein the first component and the second component comprise a magnitude component and a phase component, respectively; and
   wherein the plurality of combiners further comprise a plurality of adders adapted to add the phase component of the received signal and the phase component of the reference signal at the multiple points in time to produce the samples of the correlation signal.

21. A nonlinear signal correlator according to claim 19 further comprising:
   a bias determiner operatively coupled to the first summer and adapted to determine a bias of the correlation signal responsive to a number of the plurality of taps;
   a plurality of subtractors operatively coupled to the bias determiner and the plurality of combiners, respectively, and adapted to subtract the bias from each of the samples of the correlation signal to produce unbiased samples of the correlation signal; and
   a second summer operatively coupled to the plurality of subtractors and adapted to sum the unbiased samples of the correlation signal to produce an unbiased correlation signal.

22. A nonlinear correlator according to claim 21:
   wherein the bias comprises a mean value; and
   wherein the bias determiner comprises an averager operatively coupled to the first summer and adapted to average the correlation signal over a predetermined number of the plurality of taps.

23. A nonlinear signal correlator according to claim 19 further comprising:
   a plurality of absolute value determiners operatively coupled to the plurality of combiners, respectively, and adapted to determine an absolute value of each of the samples of the correlation signal to produce positive samples of the correlation signal; and
   a second summer operatively coupled to the plurality of absolute value determiners and adapted to sum the positive samples of the correlation signal to produce a positive correlation signal.

24. A nonlinear correlator according to claim 19 wherein a predetermined number of the plurality of taps correspond to a predetermined number of symbols in the reference signal.

25. A nonlinear signal correlator for correlating a received signal with a reference signal to produce a complex correlation signal, wherein the received signal and the reference signal are complex signals each represented by a magnitude component and a phase component, the nonlinear signal correlator comprising:
   a plurality of taps adapted to delay the received signal at multiple points in time;
   a plurality of adders operatively coupled to the plurality of taps, respectively, and adapted to add the phase component of the received signal and the phase component of the reference signal at the multiple points in time to produce samples of the complex correlation signal; and
   a first summer operatively coupled to the plurality of adders and adapted to sum the samples of the complex correlation signal to produce the complex correlation signal.

26. A nonlinear signal correlator according to claim 25 further comprising:

a bias determiner operatively coupled to the first summer and adapted to determine a bias of the complex correlation signal responsive to a number of the plurality of taps;

a plurality of subtractors operatively coupled to the bias determiner and the plurality of adders, respectively, and adapted to subtract the bias from each of the samples of the complex correlation signal to produce unbiased samples of the complex correlation signal; and a second summer operatively coupled to the plurality of subtractors and adapted to sum the unbiased samples of the complex correlation signal to produce an unbiased complex correlation signal.

27. A nonlinear signal correlator according to claim 26:

wherein the bias comprises a mean value; and wherein the bias determiner comprises an averager operatively coupled to the first summer and adapted to average the complex correlation signal over a predetermined number of the plurality of taps.

28. A nonlinear signal correlator according to claim 25 further comprising:

a plurality of absolute value determiners operatively coupled to the plurality of adders, respectively, and adapted to determine an absolute value of each of the samples of the complex correlation signal to produce positive samples of the complex correlation signal; and a second summer operatively coupled to the plurality of absolute value determiners and adapted to sum the positive samples of the complex correlation signal to produce a positive complex correlation signal.

29. A nonlinear signal correlator according to claim 25 wherein a predetermined number of the plurality of taps correspond to a predetermined number of symbols in the reference signal.

30. A nonlinear signal correlator for correlating a received signal with a reference signal to produce a positive unbiased complex correlation signal, wherein the received signal and the reference signal are complex signals each represented by a magnitude component and a phase component, the nonlinear signal correlator comprising:

a plurality of taps adapted to delay the received signal at multiple points in time;

a plurality of adders operatively coupled to the plurality of taps, respectively, and adapted to add the phase component of the received signal and the phase component of the reference signal at the multiple points in time to produce samples of a complex correlation signal;

a first summer operatively coupled to the plurality of adders and adapted to sum the samples of the complex correlation signal to produce the complex correlation signal;

a bias determiner operatively coupled to the first summer and adapted to determine a bias of the complex correlation signal responsive to a number of the plurality of taps;

a plurality of subtractors operatively coupled to the bias determiner and the plurality of adders, respectively, and adapted to subtract the bias from each of the samples of the complex correlation signal to produce unbiased samples of the complex correlation signal;

a plurality of absolute value determiners operatively coupled to the plurality of subtractors, respectively, and adapted to determine an absolute value of each of the unbiased samples of the complex correlation signal to produce positive unbiased samples of the complex correlation signal; and a second summer operatively coupled to the plurality of absolute value determiners and adapted to sum the positive unbiased samples of the complex correlation signal to produce the positive unbiased complex correlation signal.

31. A nonlinear signal correlator according to claim 30:

wherein the bias comprises a mean value; and wherein the bias determiner comprises an averager operatively coupled to the first summer and adapted to average the correlation signal over a predetermined number of the plurality of taps.

32. A nonlinear signal correlator according to claim 30 wherein a predetermined number of the plurality of taps correspond to a predetermined number of symbols in the reference signal.

33. A method for determining an optimum point in time for sampling a received signal, wherein the received signal and a reference signal are complex signals each represented by a magnitude component and a phase component, the method comprising the steps of:

a) adding the phase component of the received signal and the phase component of the reference signal at multiple points in time to produce samples of the complex correlation signal;

b) summing the samples of the complex correlation signal to produce a complex correlation signal;

c) determining a bias of the complex correlation signal;

d) removing the bias from each of the samples of the complex correlation signal to produce unbiased samples of the complex correlation signal;

e) determining an absolute value of each of the unbiased samples of the complex correlation signal to produce positive unbiased samples of the complex correlation signal;

f) summing the positive unbiased samples of the complex correlation signal to produce a positive unbiased complex correlation signal;

g) repeating the steps of (a) through (f) for a predetermined period of time to produce a plurality of complex correlation signals;

h) determining a desired complex correlation signal from among the plurality of complex correlation signals;

i) selecting a point in time corresponding to the desired complex correlation signal when the desired complex correlation signal is favorable; and j) disregarding a point in time corresponding to the desired complex correlation signal when the desired complex correlation signal is unfavorable.

34. A method according to claim 33:

wherein the bias is a mean value; and wherein the step of determining the mean value of the complex correlation signal comprises the step of averaging the complex correlation signal over a predetermined number of symbols in the reference signal.

35. A method according to claim 33 wherein the multiple points in time correspond to a predetermined number of symbols in the reference signal.

36. A method according to claim 33 wherein the step of determining the desired complex correlation signal further comprising the steps of:

comparing the plurality of complex correlation signals to one other; and determining the desired complex correlation signal as the complex correlation signal having a minimum value from among the plurality of complex correlation signals responsive to the step of comparing.

37. A method according to claim 33:

wherein the desired complex correlation signal is determined to be favorable when the desired complex correlation signal is less than a predetermined threshold; and wherein the desired complex correlation signal is determined to be unfavorable when the desired complex correlation signal is greater or equal to the predetermined threshold value.

38. A method of operating a communication unit adapted to receive a received signal and having a reference signal, wherein the received signal and the reference signal are complex signals each represented by a magnitude component and a phase component, the method comprising the steps of:

demodulating the received signal to produce a demodulated signal;

sampling the demodulated signal at multiple points in time to produce a sampled signal;

correlating the received signal with the reference signal to produce a complex correlated signal, the step of correlating further comprising the steps of:

adding the phase component of the received signal and the phase component of the reference signal at the multiple points in time to produce samples of the complex correlation signal; and summing the samples of the complex correlation signal to produce the complex correlation signal; and detecting the sampled signal responsive to the complex correlation signal to produce a detected signal.

39. A method according to claim 38 wherein the step of correlating further comprises the steps of:

determining a bias of the complex correlation signal;

removing the bias from each of the samples of the complex correlation signal to produce unbiased samples of the complex correlation signal; and summing the unbiased samples of the complex correlation signal to produce an unbiased complex correlation signal.

40. A method according to claim 39:

wherein the bias is a mean value; and wherein the step of determining the mean value of the complex correlation signal comprises the step of averaging the complex correlation signal over a predetermined number of symbols in the reference signal.

41. A method according to claim 39 wherein the step of correlating further comprises the steps of:

determining an absolute value of each of the samples of the complex correlation signal to produce positive samples of the complex correlation signal; and summing the positive samples of the complex correlation signal to produce a positive complex correlation signal.

42. A method according to claim 39 wherein the multiple points in time correspond to a predetermined number of symbols in the reference signal.

43. A communication unit adapted to receive a received signal and having a reference signal, wherein the received signal and the reference signal are complex signals each represented by a magnitude component and a phase component, the communication unit comprising:

a demodulator operatively coupled to receive the received signal and adapted to demodulate the received signal to produce a demodulated signal;

a sampler operatively coupled to the demodulator and adapted to sample the demodulated signal at multiple points in time to produce a sampled signal;

a nonlinear signal correlator for correlating the received signal with the reference signal to produce a complex correlated signal, the nonlinear signal correlator comprising:

a plurality of taps adapted to delay the received signal at multiple points in time;

a plurality of adders operatively coupled to the plurality of taps, respectively, and adapted to add the phase component of the received signal and the phase component of the reference signal at the multiple points in time to produce samples of the complex correlation signal; and a first summer operatively coupled to the plurality of adders and adapted to sum the samples of the complex correlation signal to produce the complex correlation signal; and a detector operatively couple to the sampler and adapted to detect the sampled signal responsive to the complex correlation signal to produce a detected signal.

44. A communication unit according to claim 43 wherein the nonlinear signal correlator further comprises:

a bias determiner operatively coupled to the first summer and adapted to determine a bias of the complex correlation signal responsive to a number of the plurality of taps;

a plurality of subtractors operatively coupled to the bias determiner and the plurality of adders, respectively, and adapted to subtract the bias from each of the samples of the complex correlation signal to produce unbiased samples of the complex correlation signal; and a second summer operatively coupled to the subtractor and adapted to sum the unbiased samples of the complex correlation signal to produce an unbiased complex correlation signal.

45. A communication unit according to claim 44:

wherein the bias comprises a mean value; and wherein the bias determiner comprises an averager operatively coupled to the first summer and adapted to average the correlation signal over a predetermined number of the plurality of taps.

46. A communication unit according to claim 43 wherein the nonlinear signal correlator further comprises:

a plurality of absolute value determiners operatively coupled to the plurality of adders, respectively, and adapted to determine an absolute value of each of the samples of the complex correlation signal to produce positive samples of the complex correlation signal; and a second summer operatively coupled to the plurality of absolute value determiners and adapted to sum the positive samples of the complex correlation signal to produce a positive complex correlation signal.

47. A communication unit according to claim 43 wherein a predetermined number of the plurality of taps correspond to a predetermined number of symbols in the reference signal.

* * * * *